US009917689B2

(12) United States Patent
Gulley et al.

(10) Patent No.: US 9,917,689 B2
(45) Date of Patent: *Mar. 13, 2018

(54) GENERATING MULTIPLE SECURE HASHES FROM A SINGLE DATA BUFFER

(71) Applicant: Intel Corporation, Santa Clara, CA (US)

(72) Inventors: Sean M. Gulley, Boston, MA (US); Vinodh Gopal, Westborough, MS (US); Wajdi K. Feghali, Boston, MA (US); James D. Guilford, Northborough, MA (US); Gilbert M. Wolrich, Framingham, MA (US); Kirk S. Yap, Westborough, MA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,595

(22) Filed: Aug. 8, 2016

(65) Prior Publication Data

US 2016/0352512 A1   Dec. 1, 2016

Related U.S. Application Data

(63) Continuation of application No. 14/050,326, filed on Oct. 9, 2013, now Pat. No. 9,425,953.

(51) Int. Cl.
*H04L 9/06* (2006.01)
*G06F 21/72* (2013.01)
*H04L 9/32* (2006.01)

(52) U.S. Cl.
CPC ............ *H04L 9/0643* (2013.01); *G06F 21/72* (2013.01); *H04L 9/3242* (2013.01);
(Continued)

(58) Field of Classification Search
CPC .................................. H04L 9/0643; G06F 5/06
See application file for complete search history.

(56) References Cited

U.S. PATENT DOCUMENTS

| 6,018,778 A | 1/2000 | Stolowitz |
|---|---|---|
| 7,047,530 B2 | 5/2006 | Lu |

(Continued)

FOREIGN PATENT DOCUMENTS

| JP | 2007-109238 A | 4/2007 |
|---|---|---|
| KR | 100473449 B1 | 3/2005 |

(Continued)

OTHER PUBLICATIONS

Jim, Guilford, et al., "Fast SHA-256 Implementations on Intel Architecture Processors", May 2012, 18 pages.

(Continued)

*Primary Examiner* — Oleg Korsak
(74) *Attorney, Agent, or Firm* — Grossman, Tucker, Perreault & Pfleger, PLLC

(57) ABSTRACT

One embodiment provides an apparatus. The apparatus includes a single instruction multiple data (SIMD) hash module configured to apportion at least a first portion of a message of length L to a number (S) of segments, the message including a plurality of sequences of data elements, each sequence including S data elements, a respective data element in each sequence apportioned to a respective segment, each segment including a number N of blocks of data elements and to hash the S segments in parallel, resulting in S segment digests, the S hash digests based, at least in part, on an initial value and to store the S hash digests; a padding module configured to pad a remainder, the remainder corresponding to a second portion of the message, the second portion related to the length L of the message, the number of segments and a block size; and a non-SIMD hash module (Continued)

configured to hash the padded remainder, resulting in an additional hash digest and to store the additional hash digest.

14 Claims, 4 Drawing Sheets

(52) U.S. Cl.
CPC .... *H04L 2209/12* (2013.01); *H04L 2209/125* (2013.01); *H04L 2209/20* (2013.01)

(56) References Cited

U.S. PATENT DOCUMENTS

| | | | |
|---|---|---|---|
| 7,266,825 | B2 | 9/2007 | Lankreijer |
| 7,734,674 | B2 | 6/2010 | Cohen et al. |
| 8,914,641 | B2 | 12/2014 | Gopal et al. |
| 2005/0144532 | A1 | 6/2005 | Dombrowa et al. |
| 2006/0107125 | A1 | 5/2006 | Hsu et al. |
| 2007/0294510 | A1 | 12/2007 | Stuttard et al. |
| 2008/0126852 | A1 | 5/2008 | Brandyberry et al. |
| 2010/0106976 | A1 | 4/2010 | Aciicmez et al. |
| 2010/0117873 | A1 | 5/2010 | Aciicmez et al. |
| 2010/0312801 | A1 | 12/2010 | Ostrovsky et al. |
| 2011/0035426 | A1 | 2/2011 | Chen et al. |
| 2011/0134916 | A1 | 6/2011 | Panwar et al. |
| 2012/0117361 | A1 | 5/2012 | Archer et al. |
| 2013/0132737 | A1 | 5/2013 | Horsnell et al. |
| 2014/0019693 | A1 | 1/2014 | Gulley et al. |
| 2014/0019694 | A1 | 1/2014 | Gulley et al. |
| 2014/0019725 | A1 | 1/2014 | Ozturk et al. |

FOREIGN PATENT DOCUMENTS

| | | |
|---|---|---|
| WO | 2013-147877 A1 | 10/2013 |
| WO | 2014/011743 A1 | 1/2014 |
| WO | 2014/011746 A1 | 1/2014 |

OTHER PUBLICATIONS

Jonsson, et al., "Public-Key Cryptography Standards (PKCS) #1: RSA Cryptography Specifications Version 2.1," RFC 3447, Feb. 2003, 72 pages.

Martijn, Sprengers, "GPU-based Password Cracking on the Secruity of Password Hashing Schemes Regarding Advances in Graphics Processing Units", Radboud University Nijmegen, Thesis No. 646, Feb. 2011, 118 pages.

Microsoft Developer Network, "Clean, Cold, and Warm Booting (Windows Embedded CE. 6.0)", Mar. 7, 2013, 1 page.

Ozturk, et al., "New Instructions Supporting Large Integer Arithmetic on Intel® Architecture Processors," White Paper, Aug. 2012, 16 pages.

Ozturk, et al., "RSAX Code," rsax_mod_exp_1024, Nov. 2012, 112 pages.

International Search report and Written Opinion received for PCT Patent Application No. PCT/US2013/049887, dated Sep. 27, 2013, 12 pages.

International Search report with Written Opinion received for PCT Patent Application No. PCT/US2014/056720, dated Jan. 9, 2015, 15 pages.

International Search report with Written Opinion received for PCT Patent Application No. PCT/US2014/057330, dated Dec. 15, 2014, 10 pages.

RSA Security Inc., "PKCS #1 v2.1: RSA Cryptography Standard," Public-Key Cryptography Standards (PKCS), Jun. 14, 2002, 61 pages.

RSA Security Inc., "PKCS #15 v1.1: Cryptographic Token Information Snytax Standard," Public-Key Cryptography Standards (PKCS), Jun. 6, 2000, 81 pages.

International Preliminary Report on Patentability received in related PCT Application PCT/US2014/057330 dated Apr. 21, 2016.

International Search Report and Written Opinion received for International Application No. PCT/US2013/049890, dated Aug. 29, 2013, 11 pages.

Gopal et al., "Processing Multiple Buffers in Parallel to Increase Performance on Intel Architecture Processors", Jul. 2010.

"Secure Hash Standard (SHS)", Federal Information Processing Standards Publication 180-4, Mar. 2012.

The Keyed-Hash Message Authentication Code (HMAC), Federal Information Processing Standards Publication 198-1, Jul. 2008.

The Keyed-Hash Message Authentication Code (HMAC), Federal Information Processing Standards Publication 198, Mar. 2, 2002.

Gulley, "Multi-Hash A Family of Cryptographic Hash Algorithm Extensions", Jul. 2012.

Rivest, "The MD5 Message-Digest Algorithm", MIT Laboratory for Computer Science and RSA Data Security, Inc., Apr. 1992.

Office Action issued in U.S. Appl. No. 14/050,326, dated Aug. 13, 2015.

Notice of Allowance issued in U.S. Appl. No. 14/050,326, dated Apr. 15, 2016.

Extended European Search Report issued in European Application No. 14852401.0, dated May 4, 2017, 11 pages.

Gueron, Shay, et al: "Parallelizing message schedules to accelerate the computations of hash functions", International Association for Cryptologic Research, vol. 20120605:183535, Jun. 5, 2012, pp. 1-20.

Aciicmez, Onur: "Fast Hashing on Pentium SIMD Architecture", May 11, 2004, XP055045733, Retrieved from the Internet: URL:httpz//ir.library.oregonstate.edu/xmlui/bitstream/handle/1957/11799/Actiicmez_Onur_2005.pdf?sequence=1, 50 pages.

Chinese Office Action issued in Chinese Application No. 201480049656.0, dated Dec. 4, 2017, with English translation, 33 pages.

400

Apportion at least a portion of a message of length L to a number (S) of segments
402

*Pad each segment*
*404*

Hash the S segments in parallel, resulting in S segment digests
406

*Store the S hash digests*
*408*

Pad a remainder
410

Hash the padded remainder, resulting in an additional hash digest
412

*Store the additional hash digest*
*414*

Return
416

Determine at least one initial value based, at least in part, on a first cryptographic key
502

Generate a message authentication code (MAC) based, at least in part, on at least the S segment digests
504

FIG 5

GENERATING MULTIPLE SECURE HASHES FROM A SINGLE DATA BUFFER

CROSS-REFERENCE TO RELATED APPLICATION

The present application is a continuation of U.S. patent application Ser. No. 14/050,326 filed Oct. 9, 2013, the contents of which are incorporated herein by reference.

FIELD

The present disclosure relates to hashes, and, more particularly, to generating multiple secure hashes from a single data buffer.

BACKGROUND

Cryptographic hashing algorithms typically function in a chained dependent fashion on a single buffer of data (e.g., message). The buffer of data is divided into blocks with a size of the blocks defined by a hashing algorithm, e.g., SHA-1, SHA-256, etc. The blocks are then processed serially according to a standard specification. An output of each block being processed is a hash digest that is used as input (i.e., initial digest) to processing a subsequent block of data in the buffer, thus the serial chaining constraint. Blocks are processed in this manner until each block of the data buffer has been processed. Computational intensity associated with executing a hashing algorithm combined with the serial nature of the processing results in a relatively long time for generating cryptographic hashes.

Cryptographic hashes may be utilized, for example, for secure loading of files when the files need to be authenticated. Such secure loading may occur, for example, during boot sequences or soon after boot sequences when an operating system may be running, but in a limited form, e.g., a single thread. The serial chaining constraint when determining cryptographic hashes can thus result in an unacceptably long duration associated with authenticating such files during the boot sequences.

Single instruction multiple data (SIMD) techniques may be used to accelerate, e.g., SHA-256 hashing, but such techniques typically utilize multiple independent data buffers that may require a multi-threaded environment. Such a multi-threaded environment may then require producer-consumer queues and/or significant re-architecting of the application and processing flow that is generally infeasible during, for example, the boot sequence.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 4 is a flowchart of hashing operations according to various embodiments of the present disclosure;

FIG. 5 is a flowchart of hash-based message authentication code (HMAC) operations according to various embodiments of the present disclosure.

Figure 1:
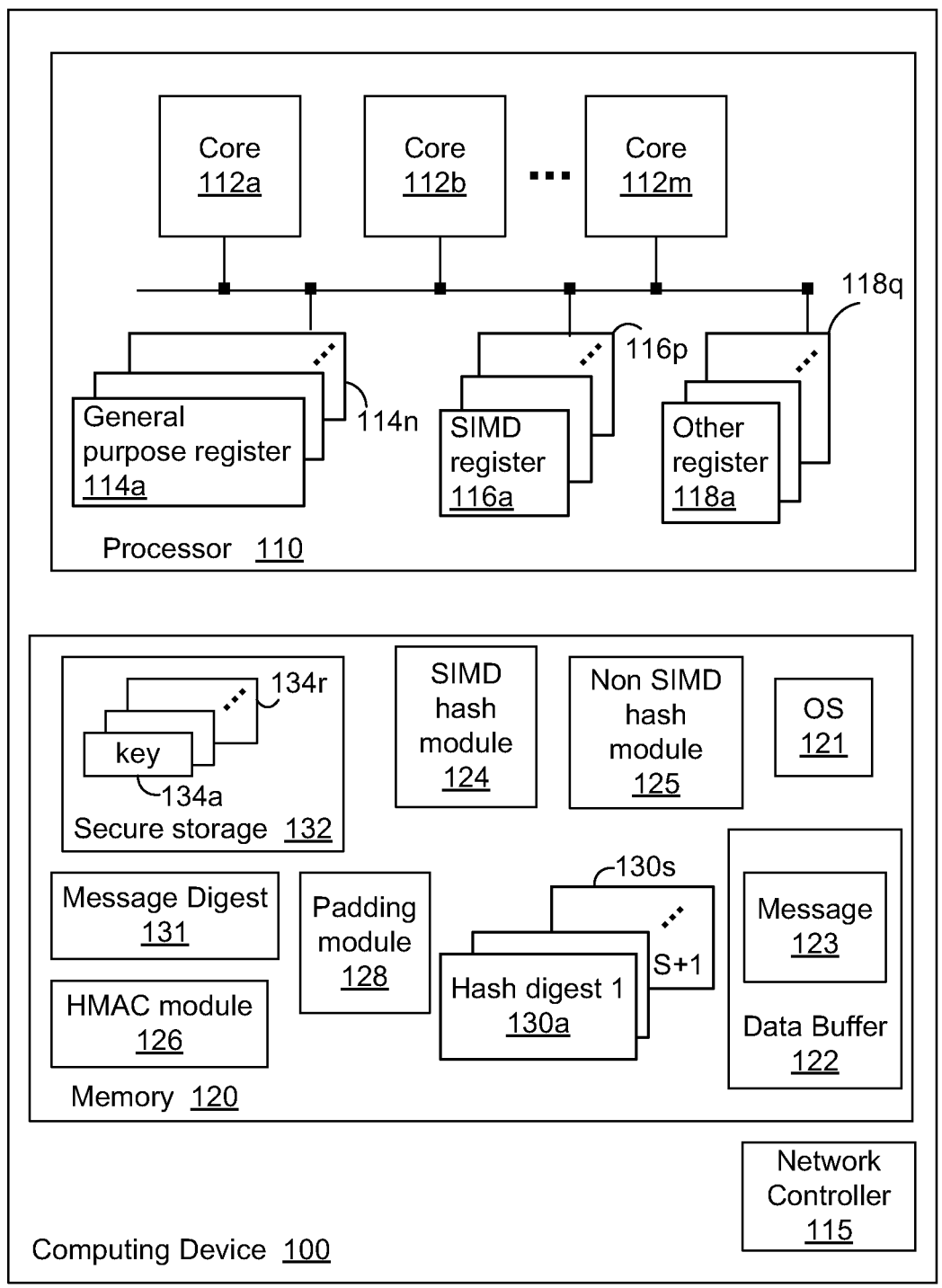
FIG. 1 illustrates a functional block diagram of a computing device consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to hash and message authentication code methods (and systems) configured to determine hash digests and/or hash-based message authentication codes (HMACs) using a single data buffer and exploiting an SIMD (single instruction-multiple data) architecture of a computing device. As used herein, "hash digest" includes segment digest, message digest and/or other hash digest. A segment digest corresponds to a hash digest of a segment. A message digest corresponds to a hash digest of a message. The message digest may be determined based, at least in part, on a plurality of segment digests. A plurality of segment digests may be calculated in parallel. In order to benefit from the reduced processing time associated with calculating the segment digests in parallel, the plurality of segment digests may be stored and/or may be utilized for further processing. The plurality of segment digests may then be utilized to, for example, generate an HMAC on a message stored in the data buffer. As use herein, a "message" is a sequence of bytes of data of arbitrary length that may correspond to one or more of data, commands, text, an application, a received bit stream, etc. A hash digest of a message (i.e., a message digest) is a fixed-length bit string that uniquely represents the message. A message authentication code (MAC) is an authentication tag that is generated using the message and a symmetric cryptographic key configured to allow authentication of a message. The MAC is typically appended to the message and a recipient may then authenticate the message by determining whether a recipient-generated MAC, determined using the received message and symmetric key, matches the MAC received with the message.

An HMAC is generated using the message and one or more cryptographic keys. In an HMAC, the cryptographic key(s) are hashed along with the message and resulting message digests may again be hashed with a same or different cryptographic key. Hashing a plurality of times using one or more cryptographic keys is configured to enhance the security of the HMAC.

The systems and methods are configured to apportion at least a portion of a message to a number of segments. The message may include a plurality of sequences of data elements. A data element size, i.e., a number of bits in a data element, may be related to a specific hash algorithm, e.g., SHA-256 word size, and/or a processor architecture, e.g., width of an SIMD register. The sequences of data elements are apportioned so that data elements are interleaved with an interleave period related to a number of segments, S. The number of segments may be determined based, at least in part, on the width of SIMD registers associated with the processor and/or processor core that is configured to determine the message digest. The number of segments S may be further based, at least in part, on a word size of a particular hashing (and/or HMAC) algorithm. The segments may then be processed, in parallel, using SIMD functionality, to generate a respective segment digest for each segment.

Hashing algorithms include, but are not limited to, MD5 and/or the SHA family (e.g., SHA-1, SHA-224, SHA-256, SHA-384, SHA-512, SHA-512/224 and SHA-512/256). An MD5 algorithm may comply or be compatible with Request for Comments (RFC) 1321, published by the Internet Engineering Task Force (IETF), titled "The MD5 Message-Digest Algorithm", published April 1992, and/or later versions of this specification. An SHA algorithm may comply or be compatible with the Federal Information Processing Standards (FIPS) Publication 180-4, published by the National Institute of Standards and Technology (NIST), Information Technology Laboratory (ITL) titled "Secure Hash Standard (SHS)", published in March, 2012 and/or later versions of this standard. The HMAC protocol may comply or be compatible with the FIPS Publication 198, published by NIST ITL, titled "The Keyed-Hash Message Authentication Code (HMAC)", published Mar. 6, 2002 and/or later versions of this standard, for example, FIPS Publication 198-1, published July 2008. Of course, in other embodiments, the secure hash protocol and/or HMAC protocol may include custom and/or proprietary secure hash and/or HMAC protocols.

For processing, each segment may be divided into blocks with each set of blocks processed in parallel. A size of the blocks may be determined based on the particular cryptographic algorithm being used, e.g., SHA-256, block size 64 bytes. Messages may typically be of arbitrary length. Thus, a message length (and associated data buffer size) may or may not be a whole number multiple of a number of segments multiplied by the block size. The message may include a remainder (i.e., R bytes) that includes data bits and/or data elements that do not evenly fit into the defined segment blocks. The remainder may be processed, as described herein, to yield an additional message digest related to the remainder.

Thus, for a message (and associated data buffer) of length L, that includes N segment blocks (i.e., number of segments S multiplied by block size B associated with a hashing algorithm) plus a remainder R bytes in the data buffer that are not included in the segment blocks, S+1 hash digests may be determined for the message. The S+1 hash digests may then be stored. Generating and storing the S+1 hash digests is configured to trade off storage for speed. In other words, while the S+1 hash digests could themselves be hashed into a single message digest, the additional processing operations may add to the overall processing time thereby reducing operational speed. While storing the S+1 hash digests may consume more storage, since the hash digests are bit-limited, e.g. 128 bits, the additional storage used may be relatively minor with respect to the savings in processing time achieved by avoiding hashing the S+1 hash digests to produce a single message digest.

FIG. 1 illustrates a functional block diagram of a computing device 100 consistent with various embodiments of the present disclosure. Computing device 100 generally includes a processor 110, a network controller 115 and a memory 120. The computing device 100 may include, but is not limited to, a mobile computing device, e.g., a laptop computer, a notebook computer, a tablet computer, a feature phone, a smartphone, a desktop computer, a server and/or another computing device that may be configured to authenticate a message and/or data. The network controller 115 is configured to manage communication between computing device 100 and a network and/or other computing devices.

The processor 110 includes one or more core(s) $112a, \ldots, 112m$, one or more general purpose register(s) $114a, \ldots, 114n$, one or more SIMD register(s) $116a, \ldots, 116p$, and/or one or more other register(s) $118a, \ldots 118q$. Each core, e.g., core 112a, is configured to perform operations associated with a power up sequence of the computing device 100, padding a message and/or generating one or more hash digest(s) and/or one or more message authentication code(s), as described herein. Each general purpose register, e.g., general purpose register 114a, is configured to support, e.g., basic integer arithmetic and/or bit and byte string operations. For example, general purpose register 114a may be configured to hold operands for logical and arithmetic operations, operands for address calculations and/or memory pointers. Other register(s) $118a, \ldots, 118q$ may include, e.g., a flag register and/or a program counter. Each SIMD register, e.g., SIMD register 116a, is configured to support execution of single instruction—multiple data operations on integers and/or floating point values. For example, SIMD registers $116a, \ldots, 116p$ may include one or more 64-bit MMX registers, one or more 128-bit XMM registers and/or one or more 256-bit YMM registers.

Each SIMD register $116a, \ldots, 116p$ has a corresponding register size and is configured to hold at least one data element in a respective execution element. A size of an execution element may correspond to a data element type, i.e., a byte, a word, a double word ("dword") or a quad word. For example, a 128-bit register may include 16 8-bit execution elements, each corresponding to a data element type of bytes, eight 16-bit execution elements, each execution element corresponding to a data type of words, four 32-bit execution elements, each corresponding to a data type dwords, two 64-bit execution elements corresponding to two data elements of data type quad words or one 128-bit execution element corresponding to one data element of data type double quad word. Thus, a single SIMD instruction may be configured to operate on at least one data element held in a respective execution element. For example, for a single SIMD instruction configured to operate on four 32-bit execution elements, a corresponding 128-bit SIMD register may hold four 32-bit dwords (each dword corresponding to an execution element). In this example, the four 32-bit dwords may then be operated on in parallel by the single SIMD instruction.

Memory 120 includes an operating system OS 121 configured to manage operations of computing device 100. OS 121 may be configured to operate in a limited mode upon, e.g., power up of the computing device 100 and/or during resume operations. During power up and/or resume operations, OS 121 may be configured to authenticate one or more modules prior to allowing the module to operate on computing device 100. Memory 120 includes a data buffer 122 configured to store a message 123. A size of the data buffer 122, e.g., L bytes, corresponds to the size of the stored message. Memory 120 further includes an SIMD hash module 124, a nonSIMD hash module 125, an HMAC module 126, a padding module 128 and storage for a plurality of hash digests $130a, \ldots 130s$. Memory 120 may include secure storage 132 configured to store one or more cryptographic key(s) $134a, \ldots, 134r$. The cryptographic keys may be associated with authenticating a message (e.g., a module prior to allowing the module to operate).

SIMD hash module 124 is configured to retrieve one or more blocks of message 123 from data buffer 122, to hash the retrieved blocks to generate a plurality of segment digests and to store the plurality of segment digests in memory 120, e.g., hash digests $130a, \ldots, 130s$. In some embodiments, the plurality of hash digests 130a, . . . , 130s may be utilized by MAC module 126, as described herein. SIMD hash module 124 is configured to hash the retrieved blocks of message 123 according to a selected hash algorithm. Each hash algorithm may include associated predefined hash parameters related to properties and/or operation of the hash algorithm. Predefined hash parameters may include a maximum message size, a block size, B, an algorithmic word size, w, and a hash digest size. For example, for SHA-256, the maximum message size is $2^{64}-1$ bits, the block size is 512 bits (i.e., 64 bytes), the algorithmic word size is 32 bits (corresponding to one dword) and the hash digest size is 256 bits (e.g., corresponding to 8 dwords).

SIMD hash module 124 is configured to apportion a plurality of sequences of data elements to a number of segments, S. The number of segments, S, is related to an SIMD register size and the algorithmic word size associated with a selected hashing algorithm. The number of segments, S, may correspond to the SIMD register size divided by the algorithmic word size. The number of segments may also correspond to a number of execution elements in a register, e.g., SIMD register 116a. Similarly, a data element size, dw, corresponds to the algorithmic word size. For example, SHA-256 is configured to process 32-bit (i.e., w=32) algorithmic words. A 32-bit execution element for an SIMD register corresponds to a dword data type. Thus, for a 256-bit SIMD register utilized by SIMD hash module 124 configured to implement SHA-256 may be configured with eight 32-bit execution elements. Message 123, of length L bytes, configured to be hashed by SIMD hash module 124 using the SHA-256 algorithm, may then include a plurality of sequences of 32-bit data elements (dw=32 bits). The number of segments corresponding to the number of execution elements may then be eight.

Each sequence of data elements may then include S data elements. The plurality of sequences of data elements may then be apportioned to the S segments by apportioning a respective data element in each sequence to a respective segment. For example, message 123 may include M sequences of S data elements (e.g., $m_0(d_0, d_1, \ldots, d_{S-1})$, $m_1(d_0, d_1, \ldots, d_{S-1})$, . . . , $m_{M-1}(d_0, d_1, \ldots, d_{S-1})$), where $m_i$ represents sequence number i and $d_j$ represents data element j in an associated sequence, i.e., sequence number i. S segments may be written as $s_0, s_1, \ldots, s_{S-1}$. Apportioning may result in segment $s_0$ including $m_0(d_0), m_1(d_0), \ldots, m_{M-1}(d_0)$, segment $s_1$ including $m_0(d_1)$, $m_1(d_1), \ldots, m_{M-1}(d_1)$ and so on until segment $s_{S-1}$ that includes $m_0(d_{S-1}), m_1(d_{S-1}), \ldots, m_{M-1}(d_{S-1})$. Apportioning in this manner is configured to avoid transposing operations and to thereby improve efficiency and reduce processing time.

Figure 2:
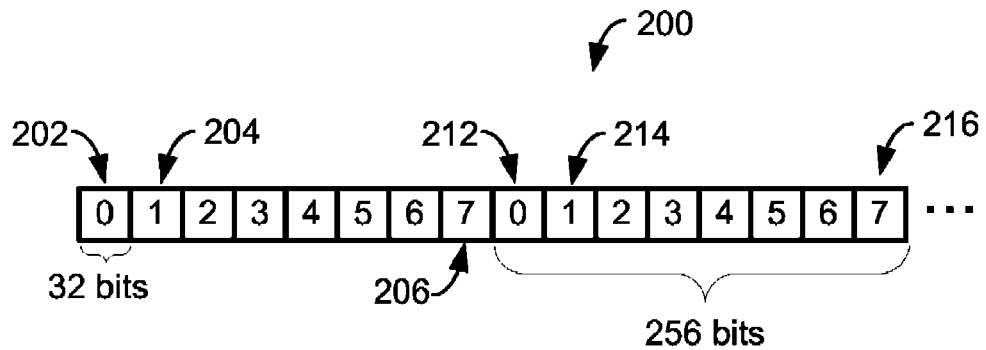
FIG. 2 illustrates apportioning a plurality of sequences of data elements to S segments.

FIG. 2 illustrates apportioning a plurality of sequences of data elements to S segments. Each box in FIG. 2 represents a data element and the number in each box represents a segment number. The segment numbers range from zero to seven corresponding to eight-segment sequences. For example, a first sequence of data elements includes eight data elements, e.g., data element 202, data element 204, and so on to data element 206 and a second sequence of data elements includes eight data elements, e.g., data element 212, data element 214 and so on to data element 216. Thus, data element 202 and data element 212 are associated with segment zero, data element 204 and data element 214 are associated with segment 1 and data element 206 and data element 216 are associated with segment 7. Thus, a respective data element in each sequence may be apportioned to a respective segment.

The number of data elements that may be apportioned may be based, at least in part, on a segment block size. As used herein, segment block size SB corresponds to a product of the number of segments, S, and the algorithmic parameter block size B (i.e., S*B). The message 123 length L may be divided into N segment blocks with a remainder of R, where R is greater than or equal to zero and less than SB and N is a whole number. The number of data elements that may be apportioned is equal to N multiplied by the block size (in, e.g., bytes) divided by the data element size (in, e.g., bytes). For example, SHA-256, has block size of 64 bytes (i.e., 512 bits) and algorithmic word size of 4 bytes (i.e., 32 bits). Assuming the number of segments is eight (i.e., register size divided by algorithmic word size). Thus, the segment block size for this example is 512 bytes (i.e., 8 segments multiplied by the block size (i.e., 64 bytes)). Up to 512*N/4=128*N data elements may be apportioned where N is a maximum whole number that satisfies 512*N≤L.

Thus, based at least in part, on a selected hashing algorithm, an SIMD register size and the message 123 size (and corresponding data buffer 122 size), L, the number, N, of segment blocks and the remainder, R, may be determined. A segment length, SL, may be determined based, at least in part, on the selected hashing algorithm and the number N. The segment length SL may correspond to the block size B multiplied by N. The segment length corresponds to a number of e.g., bytes of data elements included in each segment after the sequences of data elements have been apportioned, as described herein.

SIMD hash module 124 is configured to process the S segments according to the selected hashing algorithm, in parallel, producing S segment digests. Consistent with the selected hashing algorithm, SIMD hash module 124 may be configured to initialize each segment digest with a respective initial value. For example, SHA-256 specifies eight 32-bit initial values $H_0$-$H_7$. SIMD hash module 124 may then process the S segments in parallel, exploiting SIMD instructions and one or more of the SIMD registers 116a, . . . , 116p. Each segment may include N blocks of data elements. When the processing completes, SIMD hash module 124 may be configured to store the S segment digests 130a, . . . , 130s in memory 120. For example, a length of each segment digest 130a, . . . , 130s may be 256 bits for the SHA-256 hashing algorithm. Thus, rather than processing one block at a time, SIMD hash module 124 is configured to process S blocks in parallel and to provide S segment digests as output. The S segment digests may then be stored, used for authentication and/or processed further.

Figure 3:
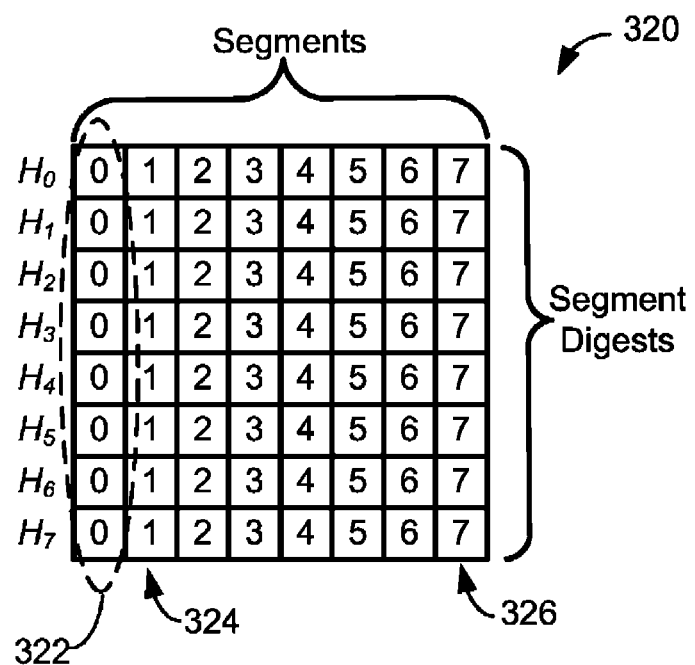
FIG. 3 illustrates segment digests that may result from hashing the segments of apportioned data elements, in parallel and according to SHA-256.

FIG. 3 illustrates segment digests that may result from the operations of, e.g., SIMD hash module 124, configured to hash the eight segments of apportioned data elements illustrated in FIG. 2, in parallel and according to SHA-256. SHA-256 is configured to produce a 256-bit hash digest that includes eight 32-bit dwords, $H_0$-$H_7$. Thus, a first segment digest 322 is associated with segment zero, a second segment digest 324 is associated with segment 1 and an eighth segment digest 326 is associated with segment 7.

Padding module 128 is configured to pad the remainder R with padding bits to achieve a padded length that corresponds to P*block size for the selected hashing algorithm, where P is a whole number. The padding is configured to be a minimum number of padding bits that results in a padded length that corresponds to P*block size, the block size corresponding to the selected hashing algorithm. The padding bits may have values (i.e., zero or one) and an order that are defined by the selected hashing algorithm. In some embodiments, the padding bits may include a binary representation of a length parameter, e.g., message length. For example, for SHA-256, padding includes a one bit (i.e., bit of value one), followed by k zero bits, followed by a 64-bit block that corresponds to a binary representation of the message length. k may be determined as the smallest nonnegative solution to R+1+k=448 mod 512, where 512 corresponds to the block size in bits of the SHA-256 algorithm. In an embodiment, the length parameter may correspond to the length of the remainder R, in, e.g., bits. In another embodiment, the length parameter may correspond to the length of the message L, in, e.g., bits.

In another embodiment, padding module 128 may be configured to pad each segment with a number of padding bits corresponding to the block size. In this embodiment, the binary representation of the length parameter may correspond to the segment length SL. SIMD hash module 124 may then be configured to process the padded segments, as described herein.

NonSIMD hash module 125 is configured to process the padded remainder according to the selected hashing algorithm producing an additional hash digest. Consistent with the selected hashing algorithm, SIMD hash module 124 may be configured to initialize the additional hash digest with an additional initial value. When the processing completes, nonSIMD hash module 125 may be configured to store the additional hash digest, e.g., 130s, in memory 120. The additional hash digest may then be used for authentication and/or processed further.

Thus, SIMD hash module 124 and nonSIMD hash module 125 are each configured to process at least a portion of a message and to produce a plurality of hash digests. Processing time may be reduced by apportioning sequences of data elements of the message to S segments and processing the S segments in parallel to produce S hash digests, as described herein. The remainder of the message may then be padded and processed to produce an additional hash digest. The S+1 hash digests may then be stored, used for authentication and/or processed further.

HMAC module 126 is configured to generate a keyed-hash message authentication code (MAC) based, at least in part, on a message, e.g., message 123, and a cryptographic key. For example, HMAC module 126 may retrieve one or more cryptographic keys, e.g., keys 134a, . . . , 134r, from secure storage 132. HMAC module 126 may be configured to generate one or more initial value(s), based, at least in part, on the cryptographic key(s) 134a, . . . , 134r, and to provide the initial value(s) to SIMD hash module 124 and/or nonSIMD module 125. SIMD hash module 124 and/or nonSIMD module 125 may be configured to use the provided initial value(s) during processing, instead of initial values associated with the selected hashing algorithms. SIMD hash module 124 and/or nonSIMD module 125 may then produce the S+1 hash digests, based at least in part on message 123 and the initial value(s), as described herein. In some embodiments, HMAC module 126 is configured to generate the MAC for message 123 based, at least in part, on at least the S segment digests produced by SIMD hash module 124.

In an embodiment, HMAC module 126 may retrieve a first cryptographic key, e.g., key 134a, may generate a first initial value based, at least in part, on the first cryptographic key 134a. HMAC module 126 may provide the first initial value to SIMD hash module 124. The SIMD hash module 124 may be configured to utilize the first initial value as the initial value for each of the S segments. HMAC module 126 may similarly provide the first initial value to the nonSIMD hash module 125 that may then utilize the first initial value as the initial value for determination of the additional hash digest, as described herein.

In another embodiment, HMAC module 126 may be configured to divide the first cryptographic key into a plurality of portions, generate a plurality of initial values and to provide S initial values to SIMD hash module 124. The SIMD hash module 124 may then be configured to utilize a respective initial value as the initial value for each respective segment. HMAC module 126 may similarly provide a respective initial value to the nonSIMD hash module 125 that may then utilize the respective initial value as the initial value for determination of the additional hash digest, as described herein.

In another embodiment, HMAC module 126 may retrieve a second cryptographic key, e.g., key 134b, and may generate a second initial value based, at least in part, on the second cryptographic key 134b. HMAC module 126 may be configured to hash an ordered set of hash digests, utilizing the second initial value. For example, the ordered set of digests may include a concatenation of the S hash digests produced by SIMD hash module 124 based, at least in part, on the first cryptographic key. In another example, the ordered set of digests may include a concatenation of the S+1 hash digests produced by SIMD hash module 124 and nonSIMD hash module 125 based, at least in part, on the first cryptographic key.

In another embodiment, HMAC module 126 may be configured to utilize the second initial value (generated based, at least in part, on the second key 134b) as the initial value for an intermediate hash operation on the S (or S+1) message digests 130a, . . . , 130s concatenated with, e.g., a preprocessed first key exclusive-OR'd with an opad, as described herein.

In another embodiment, HMAC module 126 may be configured to retrieve a third cryptographic key, e.g., key 134c, and may generate a third initial value based, at least in part, on the third cryptographic key 134c. HMAC module 126 may be configured to utilize the third initial value (generated based, at least in part, on the third key 134c) as the initial value for an intermediate hash operation on the S (or S+1) message digests 130a, . . . , 130s concatenated with, e.g., a preprocessed first key exclusive-OR'd with an opad, as described herein.

Of course, one or more of the embodiments related to HMAC module may be combined. Such combinations may be configured to provide enhanced security through use of multiple cryptographic keys for generating initial values, as described herein.

The foregoing example embodiments are configured to determine hash digests and/or hash-based message authentication codes using a single data buffer and exploiting the SIMD architecture of a computing device. A plurality of segments may be apportioned from the message stored in the data buffer and a plurality of segment digests may then be determined, in parallel. A remainder of the message may then be padded and hashed, generating an additional hash digest. The HMAC process may include determining the plurality of segment digests using one or more initial values based, at least in part, on one or more cryptographic keys. Producing and storing the plurality of segment digests (and the additional hash digest) is configured to increase the speed of the hashing operations and thereby reduce the processing time. The additional storage utilized by the plurality of segment digests and the additional hash digest may then be traded off for the increase in speed.

FIG. 4 is a flowchart 400 of hashing operations according to various embodiments of the present disclosure. In particular, the flowchart 400 illustrates generating a plurality of segment digests and an additional hash digest from a message, the segment digests generated in parallel. Operations of this embodiment include apportioning at least a first portion of a message of (unpadded) length L to a number (S) of segments 402. The message includes a plurality of sequences of data elements. The number of segments may be related to a register size, e.g., size of SIMD register 116a. Each sequence may include S data elements. A respective data element in each sequence may be apportioned to a respective segment. Thus, operations 402 are configured to interleave message data elements into segments, as described herein. In some embodiments, each segment may be padded prior to hashing at operation 404. For example, each segment may be padded with a block of padding. Operation 406 includes hashing the S segments, in parallel, resulting in (i.e., yielding) S segment digests. Each segment may include N blocks of data elements, each block having an associated block size. The S segment digests may be generated based, at least in part, on at least one initial value. In some embodiments, the S segment digests may be stored at operation 408.

A remainder may be padded at operation 410. The remainder corresponds to a second portion of the message (and data buffer). The second portion may be related to the unpadded length L, the number of segments S and the block size. Operation 412 includes hashing the padded remainder resulting in an additional hash digest. The additional hash digest may be stored at operation 414. Program flow may return at operation 416.

The operations of flowchart 400 are configured to generate a plurality of segment digests, in parallel, from a message and to generate an additional hash digest from a remainder. At least the segment digests may then be utilized to authenticate the message. In some embodiments, the operations of flowchart 400 may be included in HMAC operations configured to authenticate a message.

FIG. 5 is a flowchart of hash-based message authentication code (HMAC) operations 500 according to various embodiments of the present disclosure. In particular, the flowchart 500 illustrates one example of generating a message authentication code (MAC). Operations of this embodiment include determining at least one initial value based, at least in part, on a first cryptographic key 502. Operation 504 includes generating a MAC based, at least in part, on the S hash digests.

The operations of flowchart 500 are configured to generate a hash-based MAC for a message, e.g., message 123. The operations may include apportioning the message into segments that may then be processed (e.g., hashed) in parallel, producing a plurality of segment digests. The hashing may utilize one or more initial values that are determined, based at least in part, on one or more cryptographic keys. At least the segment digests may then be utilized in generating the MAC. The operations related to generating the MAC may also utilize one or more initial values that are determined, based at least in part, on the one or more cryptographic keys.

Figure 6:
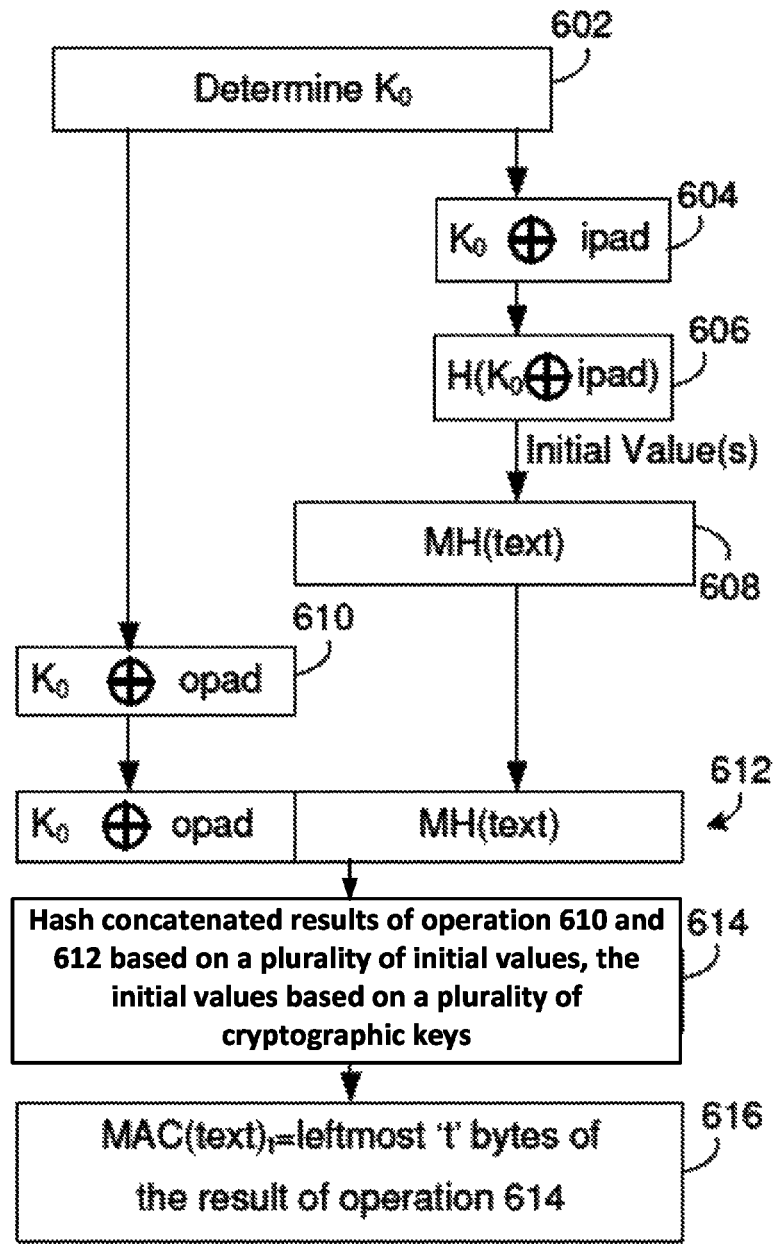
FIG. 6 is a flowchart of one example of hash-based message authentication code (HMAC) operations according to one embodiment of the present disclosure.

FIG. 6 is another flowchart of one example 600 of hash-based message authentication code (HMAC) operations according to one embodiment of the present disclosure. In particular, the flowchart 600 illustrates generating a hash-based MAC utilizing one or more initial values related to one or more cryptographic keys. Operations of this embodiment include determining at least one preprocessed cryptographic key $K_0$ 602 related to a first cryptographic key K. The preprocessing is configured to result in at least one $K_0$ with a length that corresponds to the algorithmic block size of a selected hashing algorithm. Thus, at least a portion of the first cryptographic key K may be lengthened, e.g., by appending bit(s), may be shortened, e.g., by hashing then appending bit(s) or may be unchanged if the length of the at least a portion of K corresponds to the algorithmic block size, in order to produce the at least one $K_0$. The at least one preprocessed cryptographic key $K_0$ may then be exclusive-OR'd with an inner pad (ipad) at operation 604. For example, the inner pad may correspond to a byte (e.g., $36_{hex}$), repeated B (i.e., block size in bytes) times. The result(s) of operation 604 may then be hashed at operation 606 to produce at least one initial value. For example, the first cryptographic key K may be preprocessed to produce one $K_0$ that may then be exclusive-OR'd with the ipad to produce one initial value. In another example, the first cryptographic key K may be divided into at least S portions, where S is the number of segments, and each of the at least S portions may be preprocessed, exclusive-OR'd and hashed with the ipad to produce at least S initial values.

Operation 608 includes hashing a message, e.g., message 123. Operation 608 may receive as input, the message and one or more initial values produced according to operations 602, 604 and 606. Operation 608 may include one or more of the operations illustrated in flowchart 200. Operation 608 includes generating S segment digests and may include generating an additional hash digest related to a remainder of the message, as described herein. In some embodiments, operation 608 may include hashing an ordered set of at least the S segment digests to produce an intermediate hash digest. For example, operation 608 may include hashing an ordered set of S segment digests to produce the intermediate hash digest. In another example, operation 608 may include hashing an ordered set of the S segment digests and the additional hash digest related to the remainder of the message. The initial value for hashing the ordered set may correspond to one of the at least one initial values used for input to operation 608 or may be generated based, at least in part, on a second cryptographic key. Utilizing the second cryptographic key is configured to enhance the security of the HMAC process.

Operation 610 includes exclusive-ORing one preprocessed cryptographic key $K_0$ with an outer pad (opad) to produce a result. For example, the outer pad may correspond to a byte (e.g., $5c_{hex}$), repeated B (i.e., block size in bytes) times. Operation 612 includes concatenating the result of operation 610 with the result of operation 608. The concatenated results of operations 610 and 608 may be hashed at operation 614. The initial value(s) for operation 614 may correspond to one or more of the at least one initial value used for input to operation 608, may be generated based, at least in part, on a second cryptographic key or may be generated based, at least in part, on a third cryptographic key. Operation 616 includes selecting a number of left-most bytes of the result of operation 614 as the message authentication code for the message.

The operations of flowchart 600 are configured to generate a hash-based message authentication code for a message where at least a portion of the message is hashed, in parallel, as described herein. Utilizing a plurality of initial values, generated based on a plurality of cryptographic keys, is configured to enhance the security of the HMAC process illustrated by flowchart 600.

Table 1 includes example pseudocode configured to apportion a message stored in a data buffer into S segments, to process the segments in parallel, to pad the remainder and to hash the padded remainder, as described herein. Parameters may include S (the number of segments), w (width of a segment word, i.e., algorithmic word and execution element size), B (hash algorithm specified block size) and SB (segment block size=S*B).

TABLE 1

```
//Function that provides a series of hash digests over the length of data
starting at dataPtr
hash(dataPtr, digestPtrSIMD, digestPtrFinal, length) {
        hashSIMDLen = length/SB //integer value
        hashNonSIMDLen = length − (hashSIMDLen * SB)
        //Initialize each segments digest according to selected hashing
        algorithm specification
        initializeDigestSIMD(digestPtrSIMD)
        //Parallel processing of data buffer
        while (hashSIMDLen>0) {
                hashSIMD(dataPtr, digestPtrSIMD)
                dataPtr += SB        //increment dataPtr
                hashSIMDLen−−       //decrement loop counter
        }
        //Initialize final digest according to specification
        initializeDigest(digestPtrFinal)
        //Hash the remaining portion of the data as specified
        hashnonSIMD(dataPtr, digestPtrFinal, hashNonSIMDLen)
        //digestPtrSIMD contains the S hash digests
        //digestPtrFinal contains a single hash digest
        Return
}
```

For example, for an SHA-256 hashing algorithm (32-bit word size) and a computing device that includes 256-bit SIMD registers, a number of segments S that may be processed in parallel is eight (i.e., register width/algorithmic word size). In this example, a message length and associated data buffer length is L bytes. Thus, the hashSIMD( ) function of Table 1 may operate on 8 segments.

Continuing with this example, the SHA-256 algorithmic block size B, is 64 bytes. Thus, the segment block size SB in bytes is 8*64=512 bytes. The length of the remainder is then R=(L mod SB) bytes. The data buffer length may then be L=SB*N+R bytes. The segment length SL in bytes is then B*N=64*N bytes. Each segment may then be formed by using each $8^{th}$ dword (32-bit data element) of the message up to 512*N bytes, where N is greater than zero and 512*N is less than the message length (and corresponding buffer size) L.

Thus, at least a portion of a message of length L and including a plurality of sequences of data elements may be apportioned to a number S of segments with a respective data element in each sequence apportioned to a respective segment. The segments may then be processed by a hashing algorithm, e.g., SHA-256, in parallel, resulting in the number S of segment digests. The parallel processing is configured to reduce the processing time associated with hashing messages and to thereby reduce the time associated with, for example, authentication. A remainder of the message may be padded then hashed to produce an additional hash digest, as described herein.

While the flowcharts of FIGS. 4, 5 and 6 illustrate operations according various embodiments, it is to be understood that not all of the operations depicted in FIGS. 4, 5 and/or 6 are necessary for other embodiments. In addition, it is fully contemplated herein that in other embodiments of the present disclosure, the operations depicted in FIGS. 4, 5 and/or 6, and/or other operations described herein may be combined in a manner not specifically shown in any of the drawings, and such embodiments may include less or more operations than are illustrated in FIGS. 4, 5 and/or 6. Thus, claims directed to features and/or operations that are not exactly shown in one drawing are deemed within the scope and content of the present disclosure.

The foregoing provides example system architectures and methodologies, however, modifications to the present disclosure are possible. For example, computing device 100 may also include a host processor, chipset circuitry and system memory. The host processor may include one or more processor cores and may be configured to execute system software. System software may include, for example, operating system code (e.g., OS kernel code) and local area network (LAN) driver code. LAN driver code may be configured to control, at least in part, the operation of the network controller 115. System memory may include I/O memory buffers configured to store one or more data packets that are to be transmitted by, or received by, network controller 115. Chipset circuitry may generally include "North Bridge" circuitry (not shown) to control communication between the processor 110, network controller 115 and system memory 120.

Computing device 100 may further include an operating system (OS) to manage system resources and control tasks that are run on, e.g., computing device 100. For example, the OS may be implemented using Microsoft Windows, HP-UX, Linux, or UNIX, although other operating systems may be used. In some embodiments, the OS may be replaced by a virtual machine monitor (or hypervisor) which may provide a layer of abstraction for underlying hardware to various operating systems (virtual machines) running on one or more processing units. The operating system and/or virtual machine may implement one or more protocol stacks. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network. A protocol stack may alternatively be comprised on a dedicated sub-system such as, for example, a TCP offload engine and/or network controller 115. The TCP offload engine circuitry may be configured to provide, for example, packet transport, packet segmentation, packet reassembly, error checking, transmission acknowledgements, transmission retries, etc., without the need for host CPU and/or software involvement.

The system memory may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may comprise other and/or later-developed types of computer-readable memory.

Embodiments of the operations described herein may be implemented in a system that includes one or more storage devices having stored thereon, individually or in combination, instructions that when executed by one or more processors perform the methods. The processor may include, for example, a processing unit and/or programmable circuitry. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry. "Module", as used herein, may comprise, singly or in any combination circuitry and/or code and/or instructions sets (e.g., software, firmware, etc.).

Hashing and message authenticating methods (and systems), consistent with the teachings of the present disclosure are configured to determine hash digests and/or hash-based message authentication codes (HMACs) using a single data buffer and exploiting an SIMD (single instruction-multiple data) architecture of a computing device. A plurality of segment digests may be determined in parallel. An additional hash digest may be produced, based at least in part, on a padded remainder, as described herein. At least the plurality of segment digests may then be utilized to, for example, generate an HMAC on a message stored in the data buffer. Determining a plurality of segment digests, in parallel, is configured to reduce processing time associated with authenticating messages.

Accordingly, the present disclosure provides an example apparatus. The example apparatus includes an SIMD hash module configured to apportion at least a first portion of a message of length L to a number (S) of segments, the message including a plurality of sequences of data elements, each sequence including S data elements, a respective data element in each sequence apportioned to a respective segment, each segment including a number N of blocks of data elements and to hash the S segments in parallel, resulting in S segment digests, the S hash digests based, at least in part, on an initial value and to store the S hash digests. The example apparatus further includes a padding module configured to pad a remainder, the remainder corresponding to a second portion of the message, the second portion related to the length L of the message, the number of segments and a block size; and a nonSIMD hash module configured to hash the padded remainder, resulting in an additional hash digest and to store the additional hash digest.

The present disclosure also provides an example computing device. The example computing device includes a processor including at least one SIMD register, each SIMD register configured to hold a plurality of data elements and memory including a data buffer, the data buffer configured to store a message of length L. The example computing device further includes an SIMD hash module configured to apportion at least a first portion of the message to a number (S) of segments, the message including a plurality of sequences of data elements, each sequence including S data elements, a respective data element in each sequence apportioned to a respective segment, each segment including a number N of blocks of data elements and to hash the S segments in parallel using the at least one SIMD register, resulting in S segment digests, the S hash digests based, at least in part, on an initial value and to store the S hash digests in memory. The example computing device further includes a padding module configured to pad a remainder, the remainder corresponding to a second portion of the message, the second portion related to the length L of the message, the number of segments and a block size; and a nonSIMD hash module configured to hash the padded remainder, resulting in an additional hash digest and to store the additional hash digest in memory.

The present disclosure also provides an example method. The example method includes apportioning, by an SIMD hash module, at least a first portion of a message of length L to a number (S) of segments, the message including a plurality of sequences of data elements, each sequence including S data elements, each segment including a number N of blocks of data elements, a respective data element in each sequence apportioned to a respective segment; hashing, by the SIMD hash module, the S segments in parallel, resulting in S segment digests, the S hash digests based, at least in part, on an initial value; and storing, by the SIMD hash module, the S hash digests. The example method further includes padding, by a padding module, a remainder, the remainder corresponding to a second portion of the message, the second portion related to the length L of the message, the number of segments and a block size; hashing, by a nonSIMD hash module, the padded remainder, resulting in an additional hash digest; and storing, by the nonSIMD hash module, the additional hash digest.

The present disclosure also provides an example system that includes one or more storage devices having stored thereon, individually or in combination, instructions that when executed by one or more processors result in the following operations including: apportioning at least a first portion of a message of length L to a number (S) of segments, the message including a plurality of sequences of data elements, each sequence including S data elements, a respective data element in each sequence apportioned to a respective segment, each segment including a number N of blocks of data elements; hashing the S segments in parallel, resulting in S segment digests, the S hash digests based, at least in part, on an initial value; storing the S hash digests; padding a remainder, the remainder corresponding to a second portion of the message, the second portion related to the length L of the message, the number of segments and a block size; hashing the padded remainder, resulting in an additional hash digest; and storing the additional hash digest.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method, comprising:
   selecting a hashing algorithm;
   apportioning, by single instruction multiple data (SIMD) hash circuitry, at least a first portion of a message of length L to a number (S) of segments, the message comprising a plurality of sequences of data elements, each sequence comprising S data elements, a respective data element in each sequence apportioned to a respective segment, each segment comprising a number N of blocks of data elements;
   determining, by hash-based message authentication code (HMAC) circuitry, a first initial value, based at least in part, on a first cryptographic key; and
   hashing, by the SIMD hash circuitry, the S segments in parallel based at least in part on the first initial value, resulting in S segment digests, each segment digest having a size corresponding to an algorithmic parameter block size B associated with the selected hashing algorithm; and storing, by the SIMD hash circuitry, the S segment digests in a memory;

generating, by the HMAC circuitry, a message authentication code (MAC) based, at least in part, on at least the S segment digests, wherein generating the MAC comprises hashing, by the HMAC circuitry, an ordered set comprising at least the S segment digests, the hashing resulting in an intermediate hash digest, the intermediate hash digest based, at least in part, on a second initial value, the second initial value related to a second cryptographic key.

2. The method of claim 1, further comprising:

padding, by a processor, a remainder with a padding value, the remainder corresponding to a second portion of the message, the second portion related to the length L of the message, the number of segments and a block size;

hashing, by non-SIMD hash circuitry, the padded remainder, resulting in an additional hash digest; and storing, by the non-SIMD hash circuitry, the additional hash digest.

3. The method of claim 2, wherein the padding value comprises a representation of a length parameter and the length parameter corresponds to a length of the remainder or to the length of the message L.

4. The method of claim 2, wherein the generated MAC is based on the S segments hashed by the SIMD hash circuitry and the additional hash digest hashed by the non-SIMD hash circuitry.

5. The method of claim 1, wherein generating the MAC further comprises hashing, by the HMAC circuitry, the intermediate hash digest, based, at least in part, on a third initial value related to a third cryptographic key.

6. An apparatus, comprising:

single instruction multiple data (SIMD) hash circuitry configured to:

apportion at least a first portion of a message of length L to a number (S) of segments, the message comprising a plurality of sequences of data elements, each sequence comprising S data elements, a respective data element in each sequence apportioned to a respective segment, each segment comprising a number N of blocks of data elements and to hash the S segments in parallel, resulting in S segment digests, the S segment digests based, at least in part, on a first initial value; and store the S segment digests;

hash-based message authentication code (HMAC) circuitry configured to determine the first initial value based, at least in part, on a first cryptographic key and to generate a message authentication code (MAC) based, at least in part, on at least the S segment digests, wherein the HMAC circuitry is configured to hash an ordered set comprising at least the S segment digests, the hashing resulting in an intermediate hash digest, the intermediate hash digest based, at least in part, on the first initial value and a second initial value, the second initial value related to a second cryptographic key.

7. The apparatus of claim 6, further comprising:

at least one processor configured to pad a remainder with a padding value, the remainder corresponding to a second portion of the message, the second portion related to the length L of the message, the number of segments and a block size; and non-SIMD hash circuitry configured to hash the padded remainder, resulting in an additional hash digest and to store the additional hash digest.

8. The apparatus of claim 7, wherein the padding value comprises a representation of a length parameter and the length parameter corresponds to a length of the remainder or to the length of the message L.

9. The apparatus of claim 7, wherein the generated MAC is based on the S segments hashed by the SIMD hash circuitry and the additional hash digest hashed by the non-SIMD hash circuitry.

10. The apparatus of claim 6, wherein the HMAC circuitry is further configured to hash the intermediate hash digest, based, at least in part, on a third initial value related to a third cryptographic key.

11. A computing device, comprising:

a processor comprising at least one single instruction multiple data (SIMD) register, each SIMD register configured to hold a plurality of data elements;

memory comprising a data buffer, the data buffer configured to store a message of length L;

SIMD hash circuitry configured to:

apportion at least a first portion of the message to a number (S) of segments, the message comprising a plurality of sequences of data elements, each sequence comprising S data elements, a respective data element in each sequence apportioned to a respective segment, each segment comprising a number N of blocks of data elements and to hash the S segments in parallel using the at least one SIMD register, resulting in S segment digests, the S segment digests based, at least in part, on an initial value; and store the S segment digests in memory;

hash-based message authentication code (HMAC) circuitry, configured to determine at least one initial value based, at least in part, on a first cryptographic key and to generate a message authentication code (MAC) based, at least in part, on at least the S segment digests;

wherein the HMAC circuitry is further configured to determine a first initial value and the S segment digests are based, at least in part, on the first initial value or to determine at least S initial values, and each segment digest is based, at least in part, on a respective initial value; and wherein the HMAC circuitry is configured to hash an ordered set comprising at least the S segment digests, the hashing resulting in an intermediate hash digest, the intermediate hash digest based, at least in part, on the first initial value and a second initial value, the second initial value related to a second cryptographic key.

12. The computing device of claim 11, wherein the processor is further configured to pad a remainder with a padding value, the remainder corresponding to a second portion of the message, the second portion related to the length L of the message, the number of segments and a block size; and wherein the computing device further comprises non-SIMD hash circuitry configured to hash the padded remainder, resulting in an additional hash digest and to store the additional hash digest in memory.

13. The computing device of claim 12, wherein the padding value comprises a representation of a length parameter and the length parameter corresponds to a length of the remainder or to the length of the message L.

14. The computing device of claim 11, wherein the HMAC circuitry is further configured to hash the intermediate hash digest, based, at least in part, on a third initial value related to a third cryptographic key.

\* \* \* \* \*